(12) United States Patent
Nozaki

(10) Patent No.: US 11,318,372 B2
(45) Date of Patent: May 3, 2022

(54) GAME PROCESSING PROGRAM, GAME PROCESSING METHOD, AND GAME PROCESSING DEVICE

(71) Applicant: GREE, Inc., Tokyo (JP)

(72) Inventor: Masato Nozaki, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 16/420,815

(22) Filed: May 23, 2019

(65) Prior Publication Data
US 2019/0358527 A1 Nov. 28, 2019

(30) Foreign Application Priority Data

May 24, 2018 (JP) .............................. JP2018-099308

(51) Int. Cl.
| | |
|---|---|
| A63F 13/00 | (2014.01) |
| A63F 13/215 | (2014.01) |
| A63F 13/23 | (2014.01) |
| A63F 13/52 | (2014.01) |
| A63F 13/211 | (2014.01) |

(52) U.S. Cl.
CPC ............ *A63F 13/215* (2014.09); *A63F 13/23* (2014.09); *A63F 13/52* (2014.09); *A63F 13/211* (2014.09); *A63F 2300/105* (2013.01); *A63F 2300/1025* (2013.01); *A63F 2300/1081* (2013.01); *A63F 2300/8082* (2013.01)

(58) Field of Classification Search
CPC .................................. G06F 3/012; G06F 1/163
See application file for complete search history.

(56) References Cited

U.S. PATENT DOCUMENTS

| | | | |
|---|---|---|---|
| 2015/0061969 A1* | 3/2015 | Chi ...................... | G06F 3/013 345/2.3 |
| 2016/0026253 A1* | 1/2016 | Bradski ............... | H04N 13/344 345/8 |
| 2018/0048976 A1* | 2/2018 | Kimura .................... | H04S 5/02 |

FOREIGN PATENT DOCUMENTS

| | | |
|---|---|---|
| JP | 2005-319175 A | 11/2005 |
| JP | 2009-279050 A | 12/2009 |
| JP | 2012-40209 A | 3/2012 |
| JP | 2017-217196 A | 12/2017 |
| WO | 2017/150129 A1 | 9/2017 |

OTHER PUBLICATIONS

Jan. 12, 2021 Office Action issued in Japanese Patent Application No. 2018-099308.
Jul. 28, 2020 Office Action issued in Japanese Patent Application No. 2018-099308.

\* cited by examiner

*Primary Examiner* — Omkar A Deodhar
*Assistant Examiner* — Eric M Thomas
(74) *Attorney, Agent, or Firm* — Oliff PLC

(57) ABSTRACT

A game processing device includes a scene determination portion, a sound recognition portion, a conformity determination portion, and an action controller. The scene determination portion determines whether a scene is an input scene in which sound input information can be input. The sound recognition portion, at an input scene, recognizes sound that is input as the sound input information. The conformity determination portion determines a degree of conformity between (a) the sound input information that is recognized and (b) reference information. The action controller changes an action effect according to the degree of conformity.

11 Claims, 6 Drawing Sheets

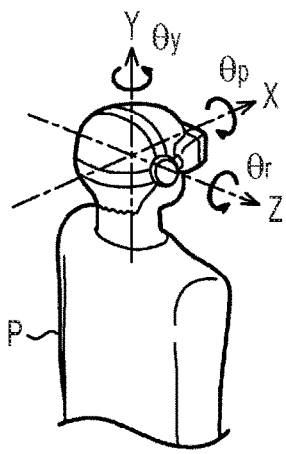
FIG. 2
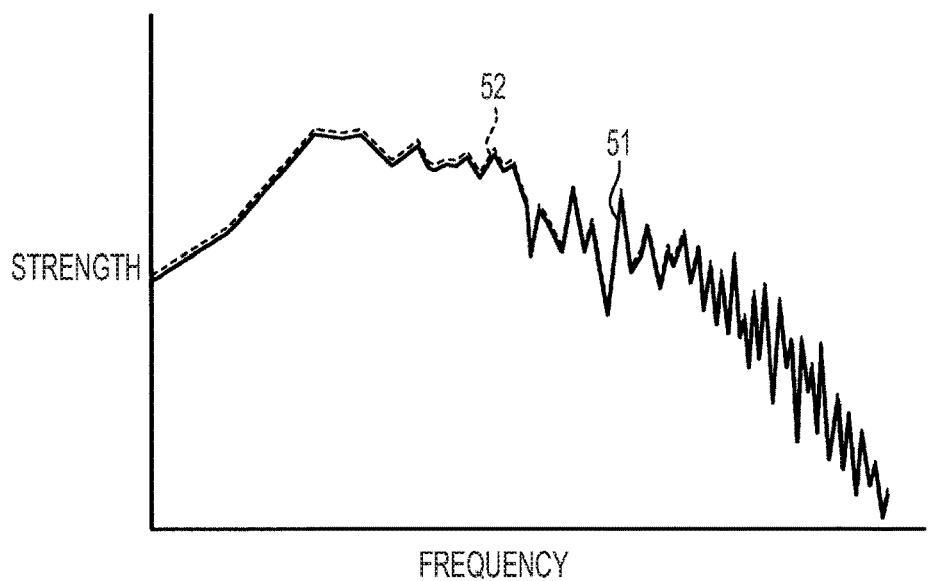
FIG. 3
| INPUT INFORMATION | ABRACODABRA |
|---|---|
| REFERENCE INFORMATION | ABRACADABRA |
| DEGREE OF CONFORMITY | 85% |
FIG. 4

GAME PROCESSING PROGRAM, GAME PROCESSING METHOD, AND GAME PROCESSING DEVICE

This application claims the benefit of priority from Japanese Patent Application No. 2018-099308 filed May 24, 2018, the entire contents of the prior application being incorporated herein by reference.

TECHNICAL FIELD

This invention relates to a game processing program, a game processing method, and a game processing device in which sound and movement of a player (i.e., a user) can be input as input information.

TECHNICAL BACKGROUND

In a virtual reality game (hereafter referred to as a "VR game"), as a display device, a head mounted display (hereafter referred to as an "HMD") is mounted on the head of a player, and he can become immersed in a game. In general, even in a VR game, there are many cases in which a game is operated by an operating device held by a hand of a player (see Patent Reference 1).

PRIOR ART TECHNOLOGY REFERENCE

Patent Reference

[Patent Reference 1] Japanese Published Patent Application 2017-217196

SUMMARY

Problem to be Resolved

In a VR game, if a game is operated by an operating device held by a hand of a user, a feeling of immersion in the game is more likely to be lost. In other words, the user's sense of immersion in the game can be spoiled by having to operate an operating device held in his or her hand. An object of the embodiments disclosed herein is to avoid this problem by providing a game processing program, a game processing method, and a game processing device in which a feeling of immersion in the game is less likely to be lost.

Means of Solving the Problem

A game processing program that solves the above problem causes a control device, which manages progress of a game and causes display of a virtual space image by a display device worn on the head of a user, to function as:

a scene determination portion that determines whether a scene is an input scene in which sound input information can be input;

a sound recognition portion that recognizes, at the input scene, sound that is input as the sound input information;

a determination portion that determines a degree of conformity between (i) the sound input information that is recognized and (ii) sound reference information; and an action controller that changes an action effect according to the degree of conformity.

According to the above structure, the sound that is input as the sound input information is recognized, and operation information is generated. Thus, when a user is playing a VR game, he is less likely to lose a feeling of immersion in the game. Furthermore, according to the degree of conformity between (i) sound input information that is recognized and (ii) sound reference information, an action effect is changed. Thus, entertainment of the game can be enhanced.

In the above game processing program, the action controller increases or decreases the action effect as the degree of conformity increases. According to the above structure, as the degree of conformity increases, the action effect increases or decreases. Thus, entertainment of the game can be enhanced.

In the above game processing program, the action controller may be provided with a threshold value, and may increase or decrease the action effect when the degree of conformity exceeds the threshold value. According to the above structure, when the degree of conformity exceeds a threshold value, the action effect increases or decreases. Thus, entertainment of the game can be enhanced.

In the above game processing program, there may be provided (i) a drawing portion that displays, in the input scene, a trajectory object according to a trajectory of a movement of a user; and (ii) a further determination portion that determines a degree of conformity between the trajectory object and drawing reference information. According to the above structure, according to the degree of conformity between (i) the trajectory object according to a trajectory of a movement of a user and (ii) the drawing reference information, the action effect is changed. Thus, when the user is playing the VR game, he is less likely to lose a feeling of immersion in the game.

A game processing method that solves the above problem manages progress of a game and causes display of a virtual space image by a display device worn on the head of a user, is provided with the steps of:

determining whether a scene is an input scene in which sound input information can be input;

recognizing sound that is input, at the input scene, as the sound input information;

determining a degree of conformity between (i) the sound input information that is recognized and (ii) sound reference information; and changing an action effect according to the degree of conformity.

A game processing device that solves the above problem manages progress of a game and causes display of a virtual space image by a display device worn on the head of a user. The game processing device is provided with:

a scene determination portion that determines whether a scene is an input scene in which sound input information can be input;

a sound recognition portion that recognizes, at the input scene, sound that is input as the sound input information;

a determination portion that determines a degree of conformity between (i) the sound input information that is recognized and (ii) sound reference information; and an action controller that changes an action effect according to the degree of conformity.

A game processing program that solves the above problem causes a control device, which manages progress of a game and causes display of a virtual space image by a display device worn on the head of a user, to function as:

a scene determination portion that determines whether a scene is an input scene in which input information can be input;

a drawing portion that displays, in the input scene, a trajectory object corresponding to a trajectory of a movement of the user;

a determination portion that determines a degree of conformity between (i) the trajectory object and (ii) drawing reference information; and an action controller that changes an action effect according to the degree of conformity.

According to the above structure, according to the degree of conformity between (i) a trajectory object corresponding to a trajectory of a movement of a user and (ii) drawing reference information, the action effect is changed. Thus, when the user is playing the VR game, he is less likely to lose a feeling of immersion in the game.

In the game processing program, the drawing portion may display a drawing reference object corresponding to the drawing reference information; and the determination portion may determine the degree of conformity between (i) the drawing reference object that is displayed and (ii) the trajectory object. According to the above structure, according to the degree of conformity between the trajectory object and the drawing reference information, the action effect is changed. Thus, entertainment of the game can be enhanced.

In the game processing program, the drawing portion may associate an additional object with a game medium, and display the associated additional object and game medium. According to the above structure, the game medium may be personalized according to the user's preference.

A game processing method that solves the above problem manages progress of a game and causes display of a virtual space image by a display device worn on the head of a user. The method is provided with the steps of:

determining whether a scene is an input scene in which input information can be input;

displaying, in the input scene, a trajectory object corresponding to the trajectory of a movement of the user;

determining the degree of conformity between (i) the trajectory object and (ii) the drawing reference information; and changing an action effect according to the degree of conformity.

The game processing device that solves the above problem manages progress of a game and causes display of a virtual space image by a display device worn on the head of a user. The game processing device is provided with:

a scene determination portion that determines whether a scene is an input scene in which input information can be input;

a drawing portion that displays, in the input scene, a trajectory object corresponding to a trajectory of a movement of the user;

a determination portion that determines a degree of conformity between (i) the trajectory object and (ii) drawing reference information; and an action controller that changes an action effect according to the degree of conformity.

Effects

According to the disclosed embodiments, a game processing program, a game processing method, and a game processing device may be provided in which a feeling of immersion in the game is less likely to be lost, thereby avoiding the problem of the user's sense of immersion in the game being spoiled by having to operate an operating device held in his or her hand.

BRIEF DESCRIPTION OF DRAWINGS

FIG. 2 is a diagram showing a coordinate system that is used for identifying a position and an orientation of a head of a player.

FIG. 3 is a diagram showing a frequency spectrum.

FIG. 4 is a diagram showing text data.

MODES TO IMPLEMENT EMBODIMENTS

With reference to FIGS. 1-12, a game processing system is explained to which the embodiments are applied.

SUMMARY

Figure 1:
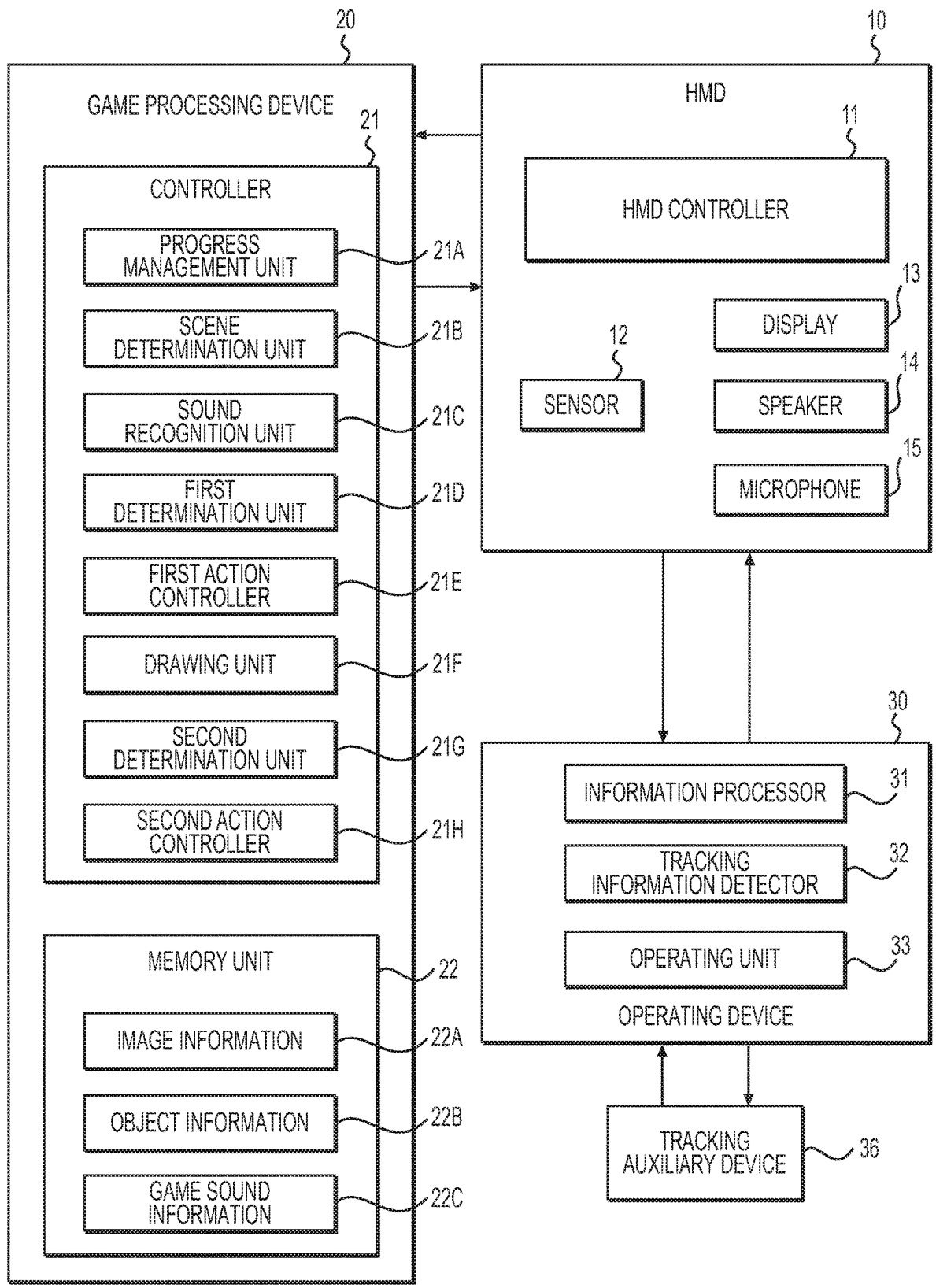
FIG. 1 is a block diagram of a game processing system.

As shown in FIG. 1, a game processing system to which the embodiments are applied is provided with (i) a head mounted display (hereafter referred to as an "HMD") 10, a game processing device 20, and an operating device 30. Wired or wireless communication is performed between the HMD 10 and the game processing device 20. Additionally, wired or wireless communication is also performed between (i) the operating device 30 and (ii) the HMD 10 and the game processing device 20.

The HMD 10 is mounted on the head of a player P (i.e., user), and the operating device 30 is operated by the player P. The game processing device 20 causes display of a virtual space image of a game by the HMD 10 from a viewpoint corresponding to a position and an orientation of the HMD 10, and manages progress of the game in the virtual space, based on information that has been detected by the HMD 10 and the operating device 30. One HMD 10 corresponds to one operating device 30. Thus, the HMD 10 and the operating device 30 that correspond to each other are used by the same player. Additionally, the game processing system may have a plurality of sets of the HMD 10 and the operating device 30. In the case of a plurality of sets, a plurality of people may simultaneously play the game.

[HMD]

The HMD 10 is provided with an HMD controller 11, a sensor 12, a display 13, and a speaker 14. The HMD 10 outputs various types of information to the game processing device 20, and various types of information are input to the HMD 10 from the game processing device 20.

The sensor 12 detects a position and an orientation of the HMD 10 in a real space. The sensor 12 is provided with at least one of, for example, a gyro sensor, an acceleration sensor, a geomagnetism sensor, and the like. For example, the sensor 12 may be further provided with an eye tracker, and a direction (line of sight direction) in which a line of sight of a player is directed may be directly detected.

The HMD controller 11 calculates the orientation (viewpoint, and a line of sight direction) of the head of the player P, using a detection result of the sensor 12. The HMD controller 11 may calculate a position of the head in addition to the orientation of the head of the player P. When the orientation of the head is calculated, the HMD controller 11 calculates angles about various axes. When the position of the head is calculated, the HMD controller 11 calculates positions in directions of three axes. For example, as shown in FIG. 2, the three axes refer to (i) an X axis along a horizontal direction, (ii) a Y axis along a vertical direction, and (iii) a Z axis along a depth direction. Angles around the axes refer to (i) a pitch θp showing a rotation direction about the X axis, (ii) a yaw θy showing a rotation direction about the Y axis, and (iii) a roll Or showing a rotation direction about the Z axis.

The HMD controller 11 includes an input/output interface and transmits the orientation of the head of the player P to the game processing device 20. When the position of the head of the player P of the HMD controller 11 is calculated, the position of the head is transmitted to the game processing device 20. According to the position and the orientation of the head of the player P, or the like, the game processing device 20 calculates the position and the orientation (a viewpoint of a camera, and a line of sight direction of the camera) of the player P in the virtual space V.

The display 13 is an example of a display device. The display 13 outputs a parallax image and causes the player P to visually recognize a three-dimensional image with a sense of depth. The game processing device 20 extracts image data for outputting a parallax image, based on the position and the orientation of the player P in the virtual space V. The game processing device 20 transmits the extracted image data to the HMD 10. The HMD controller 11 causes the display 13 to display the image in the virtual space V, using a signal received from the game processing device 20.

The speaker 14 outputs game sound such as sound effects flowing in a background of a parallax image, speech, music, and the like. The game processing device 20 grasps progress of the game, and generates sound data for outputting sound suitable to the progress of the game. The game processing device 20 transmits the generated sound data to the HMD 10. The HMD controller 11 outputs to the speaker 14 a sound signal received from the game processing device 20.

A microphone 15 converts sound of the player P to an electrical signal and generates a sound signal. Through the microphone 15, the player P can vocally input sound input information, which is an operation instruction of the game. In the game processing device 20, operation information is generated, based on the sound input information. In game processing, an operation based on the operation information is received. For example, sound is input, such as an attack method (punching, kicking, missile launching, or the like) necessary for progress of the game, a defense method (hiding, escaping, withdrawing, blocking, or the like) necessary for progress of the game, and/or magic words or the like necessary for progress of the game.

[Operating Device]

The operating device 30 is constituted so as to be able to communicate by wire or wirelessly with the HMD 10 corresponding to the operating device 30. The player P can carry the operating device 30 with him by holding it by hand, or by wearing it on a hand or an arm. The operating device 30 is, for example, a controller exclusively for the game, or a smart device such as a smartphone. Additionally, the operating device 30 is a pen or stick type controller and can draw in a three-dimensional virtual space that is displayed by the HMD 10, by detecting a trajectory of the pen or stick type controller. The operating device 30 such as this is provided with an information processor 31, a tracking information detector 32, and an operating portion 33.

The information processor 31 includes a processor, a memory, a communication interface, and the like. The information processor 31 outputs to the HMD 10 (i) a signal corresponding to a detection result of the sensor 12 and (ii) a signal corresponding to an operation with respect to the operating portion 33. The HMD 10 outputs to the game processing device 20 a signal corresponding to a signal input from the operating device 30.

The tracking information detector 32 includes a device that detects information for calculating the position and the orientation of the operating device 30. The position of the operating device 30 corresponds to the position of the hand of the player P. In the tracking information detector 32, at least one sensor among, for example, a gyro sensor, an acceleration sensor, and a geomagnetism sensor, is included. The position of the operating device 30 that is calculated from the detection result of the tracking information detector 32 may be a relative position with respect to an initial position of the operating device 30, may be a relative position with respect to the position of the HMD 10 corresponding to the operating device 30, or may be an absolute position in a real space.

The operating portion 33 is (i) a button type that the player P operates by pushing or (ii) a lever type that is moved vertically and horizontally by the player P and is constituted so as to be operable without having the player P see it. Additionally, the operating portion 33 may be a touch panel. Furthermore, the operating device 30 may directly communicate with the game processing device 20 without going through the HMD 10, and may output to the game processing device 20 (i) a signal according to a detection result from the tracking information detector 32 or (ii) a signal corresponding to an operation with respect to the operating portion 33. In this case, associating the HMD 10 with the operating device 30 may be managed in the game processing device 20, by storing associations between each identification information of the HMD and the operating device 30, or the like.

Additionally, for example, the tracking information detector 32 includes a position detection device for detecting information mainly used for calculating the position of the HMD 10. Specifically, the position detection device can detect information for calculating the orientation of the HMD 10. The position detection device may also be used for calculating the position of the HMD 10 as well as the orientation of the HMD 10.

Furthermore, in addition to the tracking information detector 32, a tracking auxiliary device 36 may be provided. For example, one out of the position detecting device and the tracking auxiliary device 36 is (i) a laser device that emits infrared light or visible light or (ii) a light emitting device such as an LED, and the other out of the position detecting device and the tracking auxiliary device 36 is a light receiving device, such as a camera, that receives light corresponding to the above light emitting device. Additionally, the following information or the like are detected: (i) from which light emitting device, among a plurality of light emitting devices having a specified arrangement, the light receiving device received light, (ii) among a plurality of light receiving devices having a specified arrangement, which light receiving device received light from the light emitting device, (iii) the emitting direction of light from the light emitting device, and (iv) the time required for the light emitted from the light emitting device to reach the light receiving device. Based on these pieces of information, the position and the orientation of the HMD 10 are calculated. When the tracking auxiliary device 36 is a light receiving device, or when the tracking auxiliary device 36 is a light emitting device and the emitted light is controlled by the game processing device 20, the tracking auxiliary device 36 may be constituted so as to be able to communicate with the game processing device 20 directly or via the HMD 10.

Furthermore, the tracking information detector 32 may be constituted so as to be able to calculate the position and the orientation of the HMD 10 using only the detection result of the tracking information detector 32 provided in the HMD 10, without using the tracking auxiliary device 36 that is arranged outside of the HMD 10. The position of the HMD 10 that is calculated from a detection result of the tracking information detection position 32 may be a relative position with respect to the initial position of the HMD 10 or may be an absolute position in a real space, that is, a three-dimensional space of a specified size where the player P is positioned when playing the game.

[Game Processing Device]

The game processing device 20 is constituted by various hardware elements such as a Central Processing Unit, a memory, an application-specific integrated circuit, and the like. The game processing device 20 is provided with (i) a controller 21 that is an example of a control device and (ii) a memory 22. Additionally, with respect to the game processing device 20 and the HMD 10, one HMD 10 may be connected to one game processing device 20, or a plurality of HMDs 10 may be connected to one game processing device 20.

The controller 21 causes the hardware elements to execute the game processing program and functions as a progress management portion 21A, a scene determination portion 21B, a sound recognition portion 21C, a first determination portion 21D, a first action controller 21E, a drawing portion 21F, a second determination portion 21G, and a second action controller 21H. The memory portion 22 stores various types of information used for progress of the game. Information stored in the memory portion 22 includes image information 22A, object information 22B, and game sound information 22C. Additionally, with respect to the memory portion 22, a game processing program is installed from an external memory medium such as a network, an optical disk, a hard disk, a USB memory, or the like.

Image information 22A is an example of virtual space information and is information for displaying an image in the virtual space V. The image in the virtual space V includes (i) an image that is a background of the virtual space V and (ii) image of objects that exist in the virtual space V. The objects that exist in the virtual space V include an object that only exists in the virtual space V.

The object is a unit element of an image that is displayed on the display 13. The object includes a game character, for example, a player character, an enemy character, an ally character, a neutral character, and the like. The object is, for example, a game medium that is a game item such as a weapon, armor, magic, a vehicle, a building, a cell phone, a smartphone, a bulletin board, and the like. For example, a game medium may be used inside or outside of a game. The game medium is data that may be changed according to the game. That is, the game medium is electronic data used for a game and is data that may be obtained, owned, used, managed, exchanged, composed, enforced, sold, abandoned, gifted, or the like, in the game by the user. For example, the game medium includes image data and/or video data showing a card, virtual currency, a ticket, a character, an avatar, and the like. Additionally, the game medium includes arbitrary medium data such as level information, status information, parameter information (physical strength value, fighting power and the like), ability information (skills, abilities, spells, jobs and the like), and the like that turns into cards, virtual currency, tickets, characters, avatars and the like. Additionally, the object includes an index such as text, an icon, a map, and the like.

The object information 22B includes (i) an identifier of the object, (ii) a type of the object, and (iii) a position of the object in the virtual space V. The position of the object is a position of the object in the virtual space V. According to the progress of the game, the position or the like of the object is updated by the controller 21.

The game sound information 22C is an example of virtual space information, and is information for outputting game sound to the HMD 10. The progress management portion 21A (i) extracts from the game sound information 22C information for outputting game sound that causes recognition by the player P, and (ii) transmits the extracted information to the HMD 10.

The progress management portion 21A manages the progress of the game. As the game is in progress by the progress management portion 21A, the scene determination portion 21B determines whether the current scene is an input scene in which input information can be input as operation information. For example, the scene determination portion 21B determines whether this is a scene in which, as input information, input is possible by a push button. Additionally, the scene determination portion 21B determines whether this is a scene in which sound input information is possible as operation information. Furthermore, the scene determination portion 21B determines whether this is a scene in which a trajectory of a movement (gesture) of a hand holding the operating device 30 of the player P can be input as operation information.

[Sound Input]

The sound recognition portion 21C recognizes sound input information that is input via the microphone 15. The sound recognition portion 21C generates a frequency spectrum for a sound input period, based on the recognized sound input information. The frequency spectrum may be calculated by Fourier-transforming a sound spectrum in which a horizontal axis for a sound input period is a time axis and a vertical axis is strength. The sound recognition portion 21C generates, for example, a frequency spectrum in which a horizontal axis for a sound input period is a frequency and a vertical axis is strength. Additionally, the sound recognition portion 21C generates text data corresponding to a sound signal, based on a sound recognition result and a text conversion dictionary.

The first determination portion 21D (i) compares with sound reference information the sound input information in which sound has been input and (ii) calculates a degree of conformity between the sound input information and the sound reference information. The sound reference information is a reference spectrum stored by the first determination portion 21D in a memory portion such as a memory. The sound reference spectrum is used when a determination is made for the sound. As shown in FIG. 3, for example, as sound input information, if there is an input scene in which the "Abracadabra" spell is input, the first determination portion 21D holds in advance a reference frequency spectrum 51, which is the "Abracadabra" spell, as sound reference information. The first determination portion 21D compares (i) the frequency spectrum 52 of the "Abracadabra" spell in which sound has been input as sound input information with (ii) the reference frequency spectrum 51 of sound reference information, and calculates the degree of conformity. With respect to the frequency spectrum 52 of the sound input information and the reference frequency spectrum 51 of sound reference information, the more the spectrums overlap each other, the higher the degree of conformity becomes, and the less the spectrums overlap each other, the lower the degree of conformity becomes.

Furthermore, as sound input information, a sound spectrum is also acceptable in which the horizontal axis is a time axis and the vertical axis is strength. In this case, the first determination portion 21D holds a sound spectrum as reference information corresponding to this sound spectrum.

Additionally, as shown in FIG. 4, the first determination portion 21D (i) recognizes the sound input information, (ii) converts it to text data, compares (a) "Abracadabra" in the text data converted from the sound input information with (b) "Abracadabra" in the text data as sound reference information, and (iii) calculates the degree of conformity. For example, if the text data as sound input information and the text data as the sound reference information are both "Abracadabra", the degree of conformity is 100%. If there is one character different from each other and the sound input information is "AbracOdabra," the degree of conformity is 85%.

Calculation of the degree of conformity in text data may be weighted according to the order of letters of the sound reference information. For example, when initial letters are different from each other, even if there is one letter different from each other, the degree of conformity is made to be lower. A difference in sound at the beginning of the word tends to result in an overall sound difference in the spell as it is said. However, even though the sounds of letters located at the middle or end are different, there are many cases in which the overall sound is the same as it is said. For example, even if there is even one letter different from each other, the beginning of the word is different in "Obracadabra", so the degree of conformity becomes lower than "AbracOdabra", which has a different middle character.

Furthermore, when the sound input information is converted to text data, if there is any silent period in the sound input information, a blank (space) may be added to a position corresponding to the silent period. Additionally, if the spoken language is English instead of Japanese, a blank (space) may be added between words by referring to a grammar dictionary or the like. Furthermore, the degree of conformity in text data may be calculated including the blank (space).

According to the degree of conformity between sound input information and sound reference information, the first action controller 21E controls an action effect. For example, as a first action control method, the first action controller 21E performs control such that the higher the degree of conformity is, the higher the action effect is made, and the lower the degree of conformity is, the lower the action effect is made. Additionally, the first action controller 21E holds a threshold value for the degree of conformity. When the degree of conformity exceeds the threshold value, the first action controller 21E makes the action effect higher than usual. Thus, the first action controller 21E changes the action effect according to the degree of conformity such that a progression status of the game changes according to the sound input by the user. When the degree of conformity is high, it is because the player can mentally associate an accurate or effective attack.

Furthermore, contrary to this, as a second action control method, the first action controller 21E performs control such that the higher the degree of conformity is, the lower the action effect is made, and the lower the degree of conformity is, the higher the action effect is made. Additionally, the first action controller 21E holds a threshold value for the degree of conformity. When the degree of conformity exceeds a threshold value, the first action controller 21E makes the action effect lower than usual. The degree of conformity is highly correlated with the player's skill level. When the degree of conformity is high, the player's skill level tends to high. Because of this, the higher the degree of conformity is, the lower the action effect is made, and the game is made difficult. The lower the degree of conformity is, the higher the action effect is made. Thus, the first action controller 21E changes the action effect according to the degree of conformity such that a progression status of the game changes according to the sound input by the user. Thus, entertainment of the game may be enhanced.

Additionally, when the character level of the user exceeds a level that is a threshold value, the control method may be switched from the first action control method to the second action control method. Thus, for a user who continuously plays the game, when he is still a beginner at the time of starting the game, the first action control method is used, and the game is made easy. When a specified level that is a threshold value is exceeded, the second action control method is used. Thus, the game is made difficult, so even when the user becomes a skilled player, the game can be made such that he can still enjoy the game just as before.

Furthermore, for the degree of conformity, a threshold value may be set that shows an action effect. In this case, the first action controller 21E shows an action effect only when the degree of conformity exceeds the threshold value. Additionally, the first action controller 21E changes the action effect according to the degree of conformity when the threshold value is exceeded. When the degree of conformity is less than the threshold value, it is determined that the spell or attack is a failure (no action effect is shown).

Figure 5:
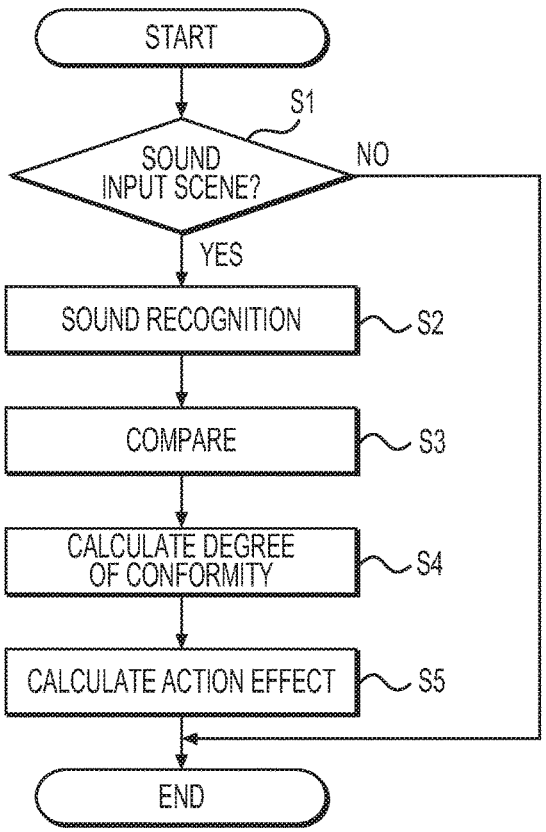
FIG. 5 is a flowchart showing a process when sound input information is input.

Next, a case in which operation information is input by sound is explained with reference to FIG. 5. In step S1, the scene determination portion 21B determines whether the current scene is an input scene in which sound input information can be input. For example, if the game is a shooting game or a martial arts game, it is determined whether the scene is, for example, a fighting scene in which various operation information, such as an attack or a defense, is input. Furthermore, if the game is a role playing game, it is determined whether the scene is, for example, a scene in which a spell is input. If the scene is an input scene in which sound can be input, the scene determination portion 21B performs, in the virtual space, a display in which sound can be input, for example.

When the player P inputs toward the microphone 15 his sound that becomes operation information, in step S2, the sound recognition portion 21C electro-acoustically converts the sound and generates sound input information. Additionally, the sound recognition portion 21C generates a frequency spectrum of the sound input period.

In step S3, the first determination portion 21D compares the frequency spectrum 52 as sound input information with the reference frequency spectrum 51 of sound reference information. In step S4, the first determination portion 21D calculates the degree of conformity between the frequency spectrum 52 of the sound input information and the reference frequency spectrum 51 of sound reference information. Additionally, the first determination portion 21D performs sound recognition of sound information as sound input information, converts it to text data, and calculates the degree of conformity in the text data.

In step S5, according to the degree of conformity between the sound information and the sound reference information, the first action controller 21E controls an action effect. For example, the first action controller 21E performs control such that the higher the degree of conformity is, the higher the action effect is made, and the lower the degree of conformity is, the lower the action effect is made. Additionally, when the degree of conformity exceeds the threshold value, the action effect is made higher than usual. Furthermore, contrary to this, the first action controller 21E performs control such that the higher the degree of conformity is, the lower the action effect is made, and the lower the degree of conformity is, the higher the action effect is made. Additionally, when the degree of conformity exceeds the threshold value, the action effect is made lower than usual.

[Motion Trajectory Input]

Figure 6:
FIG. 6 is a perspective view showing a state in which drawing is performed in a three-dimensional virtual space by a pen or stick type operating device.
Figure 7:
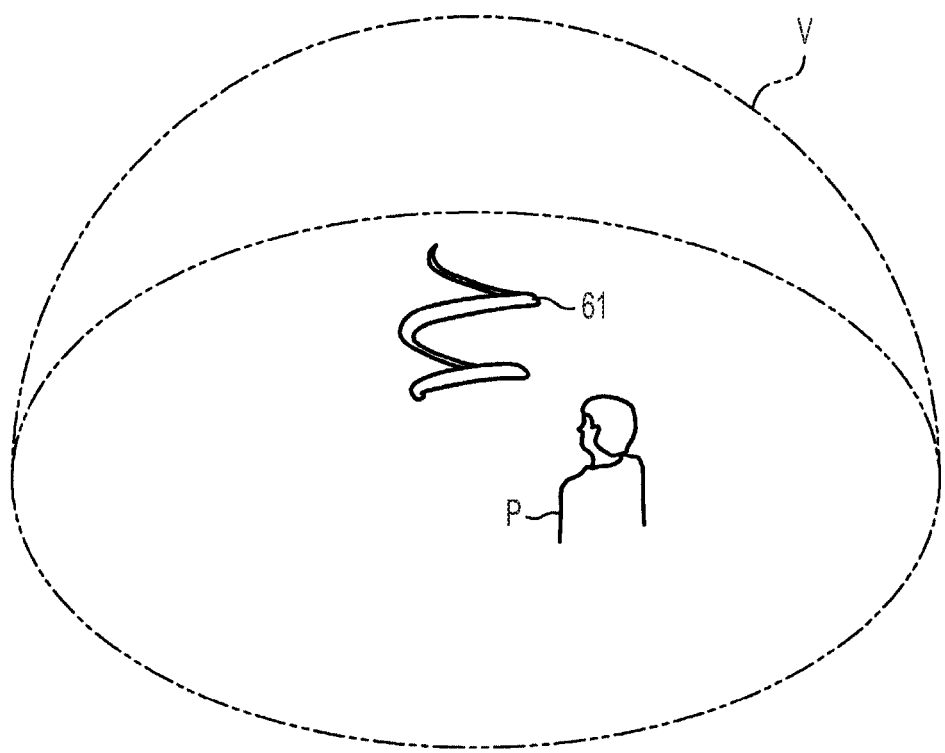
FIG. 7 is a diagram showing a virtual space in which a trajectory object is drawn.
Figure 8:
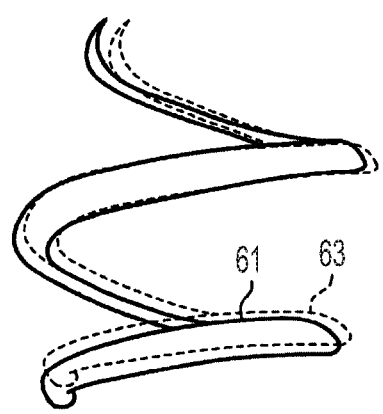
FIG. 8 is a drawing showing a trajectory object.

As shown in FIG. 6, when the player P does an action of a specified gesture such as drawing a picture or the like, writing a letter or the like, using the operating device 30 such as a pen or stick type controller or the like, the drawing portion 21F detects a trajectory of the operating device 30 in that space. In FIG. 6, the operating device 30, such as a pen or stick type controller, is moved in a spiral shape. Furthermore, as shown in FIG. 7, the drawing portion 21F draws a trajectory object 61 corresponding to the trajectory in a three-dimensional virtual space V that is displayed by the HMD 10. Furthermore, as shown in FIG. 8, the drawing portion 21F displays in the three-dimensional virtual space V a drawing reference object 63 as drawing reference information that is used as a model when the trajectory object 61 is drawn. The drawing reference information is held in a storage portion such as a memory. The trajectory object 61 and the drawing reference object 63 herein are displayed as if they were floating in the three-dimensional virtual space V. In this case, the operating device 30 is moved so as to trace the drawing reference object 63. Thus, in the three-dimensional virtual space V, the trajectory object 61 is sequentially displayed so as to trace the drawing reference object 63.

Furthermore, as the drawing reference object 63, a spiral shape need not be used, but a pattern object (for example, star-shaped polygons such as pentagram, hexagram, and the like) may be used that is like a magic circle composed of patterns or letters, which may be used to employ magic. A magic circle or the like may be drawn on a floor surface, on which the player P stands in the three-dimensional virtual space V. Additionally, it may be a three-dimensional object such as a cake. Furthermore, as the drawing reference object 63, it may be like a frame in a coloring book, and as the drawing reference object 63, the user may apply a color so as not to go out of the frame.

The second determination portion 21G compares the trajectory object 61 with the drawing reference object 63, and calculates the degree of conformity between the trajectory object 61 and the drawing reference object 63. The drawing reference object 63 becomes a correct answer (model) when the drawing input information is input, which is set in advance according to a story or the like. It may be a character or the like indicating an abstract figure, a graphic figure, a spell, an attack name, a defense name, or the like. Additionally, it may be a trajectory of the operating device 30 when the player P gestures something. For example, when the player P brandishes a sword from the top to the bottom, in the drawing reference object 63, the trajectory of the operating device 30 has a vertical straight line or arc line shape. When the player P swings a baseball bat, the trajectory has a substantially horizontal circular shape.

For example, with respect to the second determination portion 21G, the more the trajectory object 61 and the drawing reference object 63 overlap with each other, the higher the degree of the conformity is, and the less the trajectory object 61 and the drawing reference object 63 overlap with each other, the less the degree of the conformity is. As an example, overlapping of the trajectory object 61 and the drawing reference object 63 detects conformity/disconformity at pixel units, and a ratio of conformed pixels is calculated as conformity. Alternatively, conformity/disconformity is detected at pixel block units in which an image is divided, and the ratio of the conformed pixels is calculated as the degree of the conformity.

According to a degree of conformity between the trajectory object 61 and the drawing reference object 63, the second action controller 21H controls an action effect. The second determination portion 21G compares the trajectory object 61 and the drawing reference object 63 and then calculates the degree of conformity. Furthermore, according to the degree of conformity, the second action controller 21H controls the action effect. For example, as the first action control method, the second action controller 21H performs control such that the higher the degree of conformity is, the higher the action effect is made, and the lower the degree of conformity is, the lower the action effect is made. Additionally, the second action controller 21H holds a threshold value for the degree of conformity. When the degree of conformity exceeds a threshold value, the second action controller 21H makes the action effect high. Thus, the second action controller 21H changes the action effect according to the degree of conformity such that a progression status of the game changes according to the movement of the user. When the degree of conformity is high, the player may be made to mentally associate the action with an accurate or effective attack.

Furthermore, contrary to this, as the second action control method, the second action controller 21H may perform control such that the higher the degree of conformity is, the lower the action effect is made, and the lower the degree of conformity is, the higher the action effect is made. The degree of conformity is highly correlated with the player's skill level. Because of this, the higher the degree of conformity is, the lower the action effect is made, and the game is made difficult. The lower the degree of conformity is, the higher the action effect is made. Thus, the second action controller 21H changes the action effect according to the degree of conformity such that a progression status of the game changes according to the movement of the user. Thus, entertainment of the game may be enhanced.

Additionally, when the character level of the user exceeds a level that is a threshold value, the control method may be switched from the first action control method to the second action control method. Thus, for a user that continuously plays the game, when he is still a beginner at the time of starting the game, as the first action control method, the game is made easy. When the user exceeds a specified level that is a threshold value, the user can use the second action control method. Thus, the game is made difficult, so even when the user becomes a skilled player, the game can be made such that he can still enjoy the game just as before.

Figure 9:
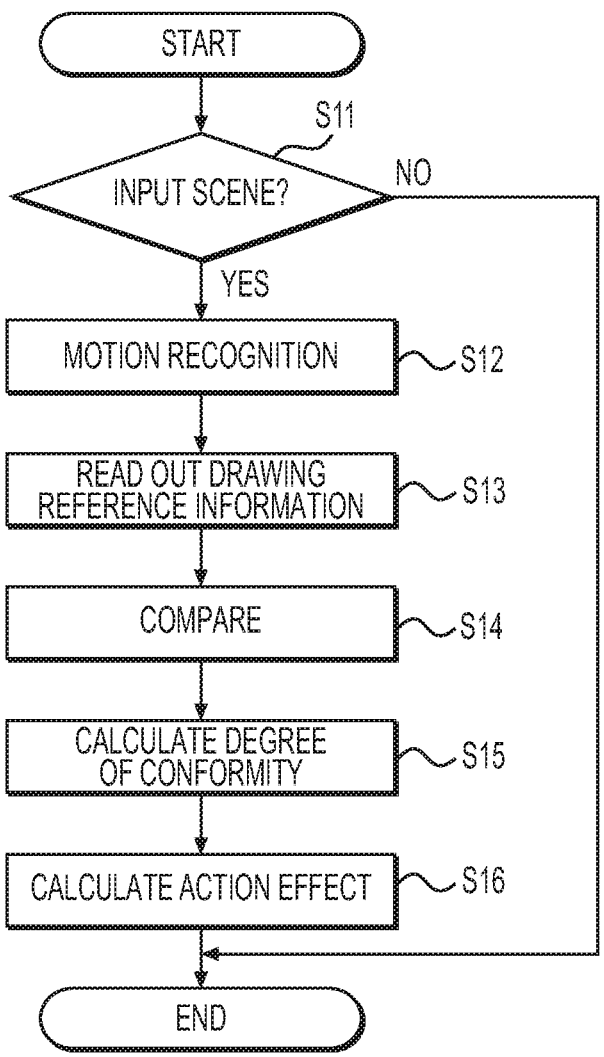
FIG. 9 is a flowchart showing a process in which a trajectory object is input as input information.

Next, a case in which input information is input by the operating device 30, such as a pen or stick type controller, is explained with reference to FIG. 9. In step S11, the scene determination portion 21B determines whether the current scene is an input scene in which drawing input information can be input. Here, the scene determination portion 21B determines whether the current scene is a scene in which the drawing input information can be input by the operating device 30, such as a pen or stick type controller. For example, if the game is a shooting game or a martial arts game, it is determined whether the scene is, for example, a fighting scene in which a motion trajectory (a movement trajectory of the operating device 30), such as an attack or a defense, is input as operation information. Furthermore, if the game is a role playing game, it is determined whether the scene is, for example, a scene in which the motion trajectory (a movement trajectory of the operating device 30) when the spell is cast is input as drawing input information. If the scene is an input scene in which the motion trajectory may be input, the scene determination portion 21B performs, in the virtual space, a display in which the motion trajectory can be input.

In step S12, the tracking information detector 32 of the operating device 30 recognizes and calculates the position and the orientation of the operating device 30. The drawing portion 21F draws, as a motion trajectory, the position, on a time axis, of the operating device 30 in the virtual space V. In step S13, the second determination portion 21G reads out the drawing reference object 63. Here, (i) the drawing reference object 63 may be displayed in the virtual space V, and the player P may be able to trace the drawing reference object 63 when drawing the trajectory object 61, (ii) the drawing reference object 63 may be displayed as a model in any area of the virtual space V, or (iii) the drawing reference object 63 may not be displayed. In step S14, the second determination portion 21G compares the trajectory object 61 and the drawing reference object 63. In step S15, the degree of conformity between the trajectory object 61 and the drawing reference object 63 is calculated.

In step S16, according to the degree of conformity between the trajectory object 61 and the drawing reference object 63, the second action controller 21H controls an action effect. For example, the second action controller 21H performs control such that the higher the degree of conformity is, the higher the action effect is made, and the lower the degree of conformity is, the lower the action effect is made. Additionally, when the degree of conformity exceeds the threshold value, the action effect is made higher than usual. Furthermore, contrary to this, the second action controller 21H performs control such that the higher the degree of conformity is, the lower the action effect is made, and the lower the degree of conformity is, the higher the action effect is made. Additionally, when the degree of conformity exceeds the threshold value, the action effect is made lower than usual.

Figure 10:
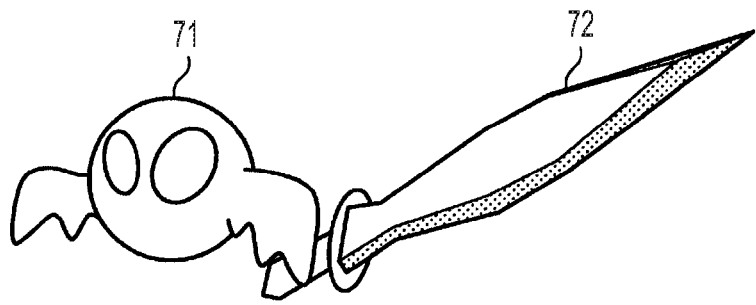
FIG. 10 is a diagram showing a state before an additional object is drawn with respect to a weapon (sword) object.
Figure 11:
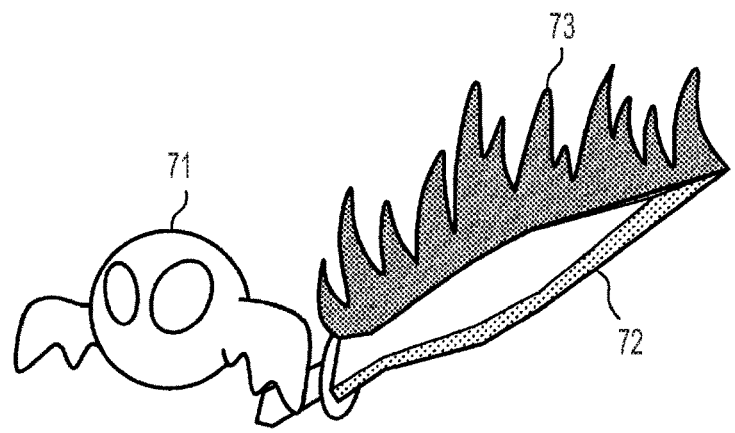
FIG. 11 is a diagram showing a state in which an additional object is drawn with respect to a weapon (sword) object.

Furthermore, the drawing portion 21F can draw, by the operating device 30 such as a pen or stick type controller, an additional object 73 as a trajectory object with respect to a weapon object 72 as a game medium held by a character object 71 as a game medium. FIG. 10 shows a scene before the additional object 73 is drawn with respect to the weapon (sword) object 72. FIG. 11 shows a scene after the additional object 73 is drawn with respect to the weapon (sword) object 72. For example, the weapon object 72 is selected by the operating device 30 such as a stick type controller. After the selection is made, by using the operating device 30, such as a stick type controller, as a brush, a pen, or the like, drawing is performed with respect to the weapon object 72. Thus, with respect to the weapon object 72, the additional object 73 is drawn as if flame were going out of the sword. The additional object 73 herein is an effect object showing a weapon effect. Thus, the additional object 73 is associated with the weapon object 72, and the weapon object 72 is displayed in a state in which the additional object 73 is added. Thus, the weapon object 72 may be personalized according to the player P's preference. Additionally, striking power or the like of the weapon object 72 may be made high by adding the additional object 73. Such a mode can be performed in a scene different from that of the processing of FIG. 9, and the scene determination portion 21B determines the scene.

Furthermore, the additional object 73 may function as the trajectory object 61. That is, by drawing by the operating device 30 such that flame is going out of the sword, the drawing portion 21F draws the additional object 73. In this case, an ideal (model) shape of the flame is the drawing reference object 63, the second determination portion 21G compares the trajectory object 61, which is the additional object 73, with the drawing reference object 63, and the degree of conformity is calculated. Furthermore, the action effect is controlled by the second action controller 21H. At the same time, the trajectory object 61 is associated with the weapon object 72 as the additional object 73 and is displayed.

[Hardware Structure]

Figure 12:
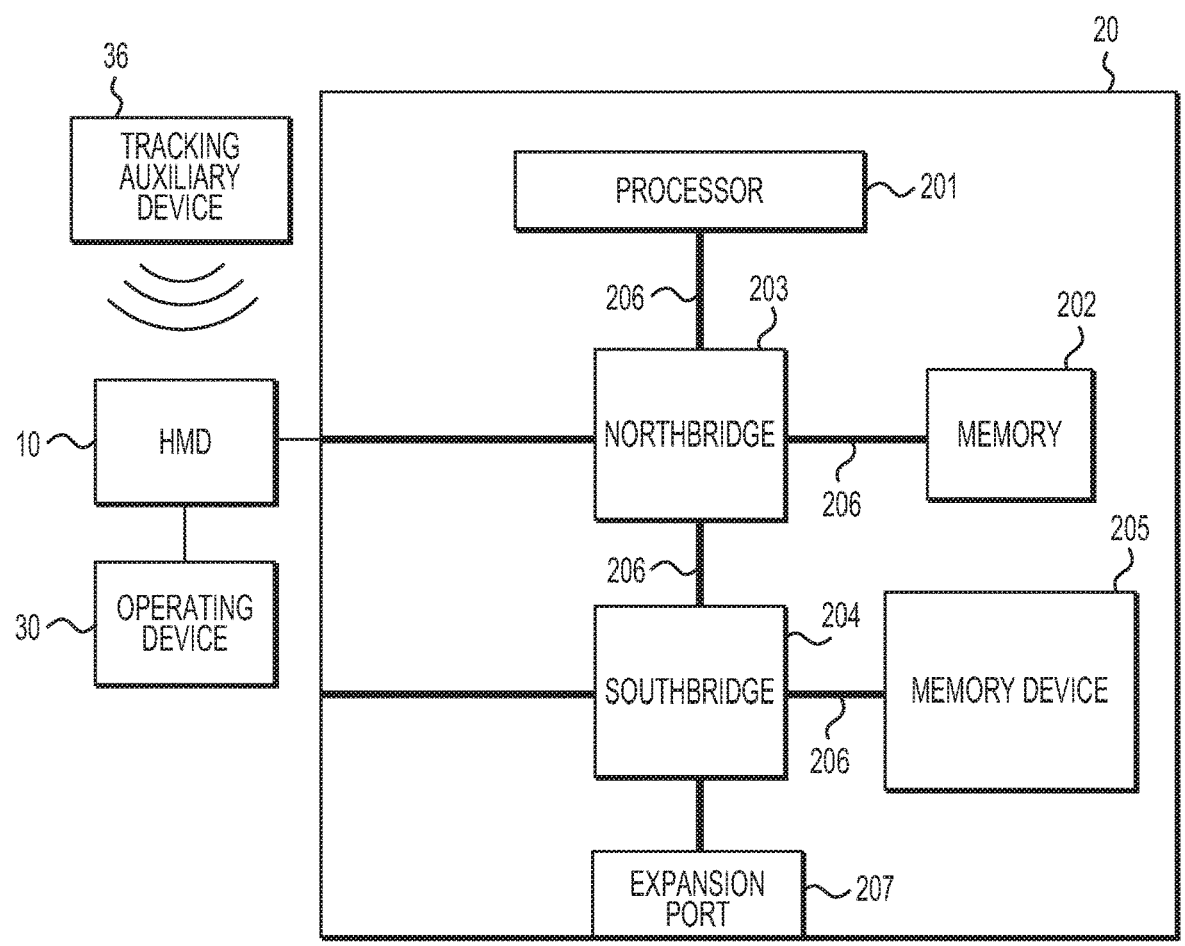
FIG. 12 is a diagram showing a hardware structure of a game processing device.

With reference to FIG. 12, a hardware structure of the game processing device 20 of this embodiment is explained.

FIG. 12 is a diagram showing an example of the game processing device 20. The game processing device 20 is a desktop personal computer, a notebook personal computer, a personal digital assistant (PDA), a server, a game machine exclusively for home or business use, another types of computer, or the like. Furthermore, a structure shown in FIG. 12, and a connecting relationship of each element, are an example.

The game processing device 20 is provided with a processor 201 and a memory 202. Additionally, the game processing device 20 is provided with a northbridge 203, a southbridge 204, and a memory device 205. The processor 201, the memory 202, and the bridges 203 and 204 are connected to each other, using various types of busses 206. The processor 201 manages the progress of the game and causes the HMD 10 or the like connected to the northbridge 203 to output an image. Furthermore, the game processing device 20 may be provided with a plurality of processors and may be provided with a plurality of memories.

The memory 202 is connected to the northbridge 203 and outputs to the processor 201 information regarding game processing. For example, the memory 202 is a volatile memory device or a non-volatile memory device. Additionally, the memory 202 is a memory medium such as a magnetic or optical disk or the like.

The memory device 205 is connected to the southbridge 204 and outputs to the processor 201 the information regarding game processing. For example, the memory device 205 is a hard disk device, an optical disk device, a flash memory, or other memory device.

The northbridge 203 is connected to the HMD 10. The southbridge 204 is connected to an expansion port 207. The expansion port 207 may include various communication ports (for example, a USB, a Bluetooth (registered trademark) device, an Ethernet (registered trademark) device, a wireless Ethernet device) and may be connected to an input/output device such as a keyboard, a mouse, a network device, or the like.

In the above structure, the processor 201, the memory 202, and the northbridge 203 correspond to the controller 21, and the memory 202 and the memory device 205 correspond to the memory portion 22.

As explained above, according to this embodiment, the following effects may be obtained.

(1) The sound input information as operation information can be input via the microphone 15. Thus, the player P is less likely to lose a feeling of immersion in the game when he is playing the VR game. Furthermore, according to the degree of conformity between the sound input information that is recognized and the sound reference information, the action effect is changed, so entertainment of the game can be enhanced.

(2) The higher the degree of conformity is, the higher the action effect can be made. Furthermore, when the degree of conformation exceeds a threshold value, the action effect can be made high. Thus, entertainment of the game can be enhanced.

(3) The higher the degree of conformity is, the lower the action effect can be made. Furthermore, when the degree of conformation exceeds a threshold value, the action effect can be made low. Thus, the game can be made difficult for a player P having a high skill level.

(4) According to the degree of conformity between the trajectory object 61 and the drawing reference object 63, the action effect can be changed. Thus, the player P is less likely to lose a feeling of immersion in the game when he is playing the VR game. Additionally, entertainment of the game can be enhanced.

(5) By displaying the drawing reference object 63, it can be made easier for the player P to increase the degree of conformity of the trajectory object 61 with respect to the drawing reference object 63.

(6) By associating the additional object 73 as a trajectory object with the weapon object 72 and displaying it, the game medium such as the weapon object 72 can be personalized according to the player P's preference.

Each of the above embodiments may be modified and implemented as follows.

By referencing both the degree of conformity in the case of the sound input and the degree of conformity of the trajectory object, the action effect may be made higher or lower. For example, there is a case in which a magic circle is drawn as a spell is being cast. In such a case, for example, the average of (i) the degree of conformity in the case of the sound input and (ii) the degree of conformity of the trajectory object is calculated. Furthermore, according to the average of the degrees of conformity, the action effect can be changed. Specifically, the higher the average of the degree of conformity is, the higher the action effect can be made. Additionally, when the average of the degrees of conformity exceeds a threshold value, the action effect can be made high. Contrary to this, when the average of the degrees of conformity becomes high, the action effect can be made low. Furthermore, when the average of the degrees of conformity exceeds a threshold value, the action effect can be made low.

When both (i) the degree of conformity in the case of the sound input and (ii) the degree of conformity of the trajectory object exceed a threshold value, an action effect such as "mission completed" may be generated. Additionally, depending on the degree of conformity in the case of the sound input, a determination such as "mission completed" may be made, and depending on the degree of conformity of the trajectory input, points obtained by the player may be changed (the higher the degree of conformity is, the higher or lower the points obtained by the player). Furthermore, depending on the degree of conformity in the case of the trajectory input, a determination such as "mission completed" may be made, and depending on the degree of conformity of the sound input, the points obtained by the player may be changed (the higher the degree of conformity is, the higher or lower the points obtained by the player).

The object associated with the additional object 73 is not limited to the weapon object 72. For example, an accompanying object that accompanies the character object 71 may be associated as the additional object 73. The accompanying object may contact or be separated from the main character object 71 and is a character that is constantly accompanying an object. Depending on the scene, the accompanying object is a character that (i) attacks an enemy character, (ii) defends, or (iii) acts as a substitute, with the main character object 71.

As the additional object 73, instead of the object showing the effect of the weapon object 72, a pattern such as a design of an item object such as the character object 71 or the weapon object 72 may be used.

The trajectory object 61 that is input during the game is not limited to a spiral figure as shown in FIGS. 6-8. As an example, the trajectory object 61 may be characters showing a command (for example, letters such as "kick, punch, guard"). Additionally, a picture or a diagram, such as cake, fish, or an airplane, may be used.

When the trajectory object 61 is drawn, the drawing reference object 63 that becomes a model may or may not be displayed. For example, when the drawing reference object 63 is displayed, drawing becomes easy; thus, it may be made as one of settings in a beginner or intermediate mode. Additionally, when the drawing reference object 63 is not displayed, it may be made as one of settings in an advanced mode. When the drawing reference object 63 is not displayed, the player P relies on his memory and draws the trajectory object 61. For example, when the drawing reference object 63 is a known subject matter such as a sunflower, the player P draws the trajectory object 61 of a sunflower. Furthermore, when the drawing reference object 63 is displayed in the three-dimensional virtual space V, and the trajectory object 61 is input as if the drawing reference object 63 were traced, it can be made as one of settings in an introductory mode.

Furthermore, depending on the scene, whether there is a display of the drawing reference object 63 or how to display the drawing reference object 63 may be changed. For example, in an early or middle stage of the game, the player P is not yet used to the operation; thus, the drawing reference object 63 may be displayed. In the final stage(s) of the game, the drawing reference object 63 may be made not to be displayed.

The processing in which the action effect is made high once the degree of conformity becomes high may be set as a beginner or intermediate mode, and the processing in which the action effect is made low once the degree of conformity becomes high may be set as an advanced mode.

A threshold value that is arranged when the action effect is changed may be one or a plurality of threshold values. As the number of thresholds increases, the action effect can be changed in more stages. If no threshold value is set, the action effect may gradually change depending on the degree of conformity.

The type of game, the sound input information, or the scene(s) in which a trajectory object is drawn are not limited to the above examples.

[In the Case of Sound Input]

In the case of a romance simulation game, when a specified line is input as sound input information, the higher the degree of conformity with a frequency spectrum as sound reference information is, the higher likability for a counterpart of the player P may be made.

When imitating celebrities in a karaoke game, a frequency spectrum of a specified celebrity may be used as sound reference information, and the degree of conformity between the frequency spectrum of the sound reference information and a frequency spectrum of sound input information of the player P may be calculated. It is determined that the higher the degree of conformity is, the better the imitation is, which may help the player P obtain more points.

[In the Case of Trajectory Object]

For example, in the case of a game in which a player is conducting an orchestra, the degree of conformity between (i) the trajectory object 61 showing a trajectory of a baton as the operating device 30 and (ii) the drawing reference object 63 showing a correct trajectory of a baton may be calculated. In this case, as the degree of conformity is higher, music and symphonies with a higher degree of completeness are reproduced, and as the degree of conformity is lower, music and symphonies with a lower degree of completeness are reproduced.

In the case of a fishing game, the degree of conformity between (i) the trajectory object 61 showing a trajectory of a tip of a fishing pole as the operating device 30 and (ii) the drawing reference object 63 showing a correct trajectory of a tip of the fishing rod may be calculated. In this case, the higher the degree of conformity is, the more the probability of catching a fish that is difficult to catch increases, and the lower the degree of conformity is, the more the probability of a fishing line or a fishing leader being cut increases.

As an HMD, for example, there is a cap-type nontransparent head mounted display. Furthermore, this may be a spectacles type of in which a projecting device is mounted on a top portion or a front portion of spectacles and an image is projected onto a transparent plate portion, or may be a type in which a smart device such as a smartphone is mounted on a spectacles type adapter. Additionally, this may be a cap type in which a projecting device is mounted on a top portion or a front portion of spectacles and an image is projected onto a transparent plate portion. Furthermore, a display may be nontransparent, which does not allow a user to see the outside or may be optically transparent, which allows a user to see the outside, and in which a display device is formed by a half mirror. Additionally, a projecting method may be a virtual image projection method that forms a virtual image by using a half mirror or the like, or may be a retinal projection method, which causes image formation directly on the retina using the crystalline lens of the eyes of a user.

Three-dimensional projected images that are visually recognized with the HMD may be made by an anaglyph method in which images projected from differing angles left and right are reproduced overlapping with red and blue light, respectively and are viewed by spectacles having red and blue color filters on right and left sides. Additionally, this may be a polarized spectacles method that projects an image by overlapping linearly polarized light perpendicular to right and left images, and separating them by spectacles having a polarization filter. Furthermore, this may be a liquid crystal shutter spectacle method, which alternately reproduces images shot from different angles right and left, which are viewed by spectacles having liquid crystal shutters that alternately obstruct the right and left fields of vision.

EXPLANATION OF SYMBOLS

10 HMD
11 HMD controller
12 Sensor
13 Display
14 Speaker
15 Microphone
20 Game processing device
21 Controller
21A Progress management unit
21B Scene determination unit
21C Sound recognition unit
21D First determination unit
21E First action controller
21F Drawing unit
21G Second determination unit
21H Second action controller
22 Memory unit
22A Image information
22B Object information
22C Game sound information
30 Operating device
31 Information processor
32 Tracking information detector
33 Operating unit
36 Tracking auxiliary device
51 Reference frequency spectrum
52 Frequency spectrum
61 Trajectory object
63 Drawing reference object
71 Character object
72 Weapon object
73 Additional object
201 Processor
202 Memory
203 Northbridge
203 Bridge
204 Southbridge
204 Bridge
205 Memory device
206 Bus
207 Expansion port

The invention claimed is:

1. A non-transitory computer-readable medium storing a game processing program that causes a processor, which manages progress of a game and causes display of a virtual space image by a display device worn on a head of a user, to function as:
   a scene determination portion that determines whether a scene is an input scene that accepts input of sound input information;

a sound recognition portion that recognizes, at the input scene, sound that is input by the user as the sound input information;
a first conformity determination portion that determines a first degree of conformity between (i) the sound input information that is recognized and (ii) sound reference information prestored in a memory; and
an action controller that changes an action effect according to the first degree of conformity such that a progression status of the game changes according to the sound input by the user.

2. The non-transitory computer-readable medium according to claim 1, wherein
the action controller increases or decreases the action effect as the first degree of conformity increases.

3. The non-transitory computer-readable medium according to claim 1, wherein
the action controller is provided with a threshold value and increases or decreases the action effect when the first degree of conformity exceeds the threshold value.

4. The non-transitory computer-readable medium according to claim 1, further comprising
a drawing portion that displays, at the input scene, a trajectory object according to a trajectory of a movement of the user; and
a second conformity determination portion that further determines a second degree of conformity between the trajectory object and drawing reference information prestored in the memory, wherein
the action controller changes the action effect according to the second degree of conformity.

5. A game processing method that manages progress of a game and causes display of a virtual space image by a display device worn on the head of a user, the method comprising the steps of:
determining whether a scene is an input scene that accepts input of sound input information;
recognizing sound that is input by the user, at the input scene, as the sound input information;
determining a degree of conformity between (i) the sound input information that is recognized and (ii) sound reference information prestored in a memory; and
changing an action effect according to the degree of conformity such that a progression status of the game changes according to the sound input by the user.

6. A game processing device that manages progress of a game and causes display of a virtual space image by a display device worn on the head of a user, comprising a processor programmed to function as:
a scene determination portion that determines whether a scene is an input scene that accepts input of sound input information;
a sound recognition portion that recognizes, at the input scene, sound that is input by the user as the sound input information;
a conformity determination portion that determines a degree of conformity between (i) the sound input information that is recognized and (ii) sound reference information prestored in a memory; and
an action controller that changes an action effect according to the degree of conformity such that a progression status of the game changes according to the sound input by the user.

7. A non-transitory computer-readable medium storing a game processing program that causes a processor, which manages progress of a game and causes display of a virtual space image by a display device worn on the head of a user, to function as:
a scene determination portion that determines whether a scene is an input scene that accepts input of drawing input information;
a drawing portion that displays, at the input scene, a trajectory object according to a trajectory of a movement of the user that is input as the drawing input information;
a conformity determination portion that determines a degree of conformity between (i) the trajectory object and (ii) drawing reference information prestored in a memory; and
an action controller that changes an action effect according to the degree of conformity such that a progression status of the game changes according to the movement of the user.

8. The non-transitory computer-readable medium according to claim 7, wherein
the drawing portion displays a drawing reference object corresponding to the drawing reference information, and
the conformity determination portion determines the degree of conformity between (i) the drawing reference object that is displayed and (ii) the trajectory object.

9. The non-transitory computer-readable medium according to claim 7, wherein
the drawing portion associates an additional object with a game medium, and displays the associated additional object and the game medium.

10. A game processing method that manages progress of a game and causes display of a virtual space image by a display device worn on the head of a user, the method comprising the steps of:
determining whether a scene is an input scene that accepts input of drawing input information;
displaying, at the input scene, a trajectory object according to the trajectory of a movement of the user that is input as the drawing input information;
determining a degree of conformity between (i) the trajectory object and (ii) the drawing reference information prestored in a memory; and
changing an action effect according to the degree of conformity such that a progression status of the game changes according to the movement of the user.

11. A game processing device that manages progress of a game and causes display of a virtual space image by a display device worn on the head of a user, comprising a processor programmed to function as:
a scene determination portion that determines whether a scene is an input scene that accepts input of drawing input information;
a drawing portion that displays, at the input scene, a trajectory object according to a trajectory of a movement of the user that is input as the drawing input information;
a conformity determination portion that determines a degree of conformity between (i) the trajectory object and (ii) drawing reference information prestored in a memory; and
an action controller that changes an action effect according to the degree of conformity such that a progression status of the game changes according to the movement of the user.

* * * * *